(12) United States Patent
Keating

(10) Patent No.: US 10,952,829 B2
(45) Date of Patent: Mar. 23, 2021

(54) TOOTH FIXTURING USING MACHINABLE MATRICES

(71) Applicant: Global Dental Science, LLC, Scottsdale, AZ (US)

(72) Inventor: Scott Keating, Louisville, CO (US)

(73) Assignee: Global Dental Science LLC, Scottsdale, AZ (US)

(*) Notice: Subject to any disclaimer, the term of this patent is extended or adjusted under 35 U.S.C. 154(b) by 453 days.

(21) Appl. No.: 15/823,379

(22) Filed: Nov. 27, 2017

(65) Prior Publication Data

US 2018/0147032 A1    May 31, 2018

Related U.S. Application Data

(60) Provisional application No. 62/426,572, filed on Nov. 27, 2016.

(51) Int. Cl.

| B29C 64/40 | (2017.01) |
| A61C 13/00 | (2006.01) |
| A61C 13/12 | (2006.01) |
| A61C 8/00 | (2006.01) |
| A61C 13/01 | (2006.01) |
| A61C 13/08 | (2006.01) |
| B33Y 10/00 | (2015.01) |

(Continued)

(52) U.S. Cl.
CPC ........ *A61C 13/0006* (2013.01); *A61C 8/0018* (2013.01); *A61C 13/0004* (2013.01); *A61C 13/01* (2013.01); *A61C 13/12* (2013.01); *A61C 13/08* (2013.01); *A61C 13/1016* (2013.01); *A61C 13/225* (2013.01); *B29L 2031/7536* (2013.01); *B33Y 10/00* (2014.12); *B33Y 80/00* (2014.12)

(58) Field of Classification Search
CPC .. B33Y 10/00; B33Y 80/00; B29L 2031/7536
USPC .......................................................... 264/19
See application file for complete search history.

(56) References Cited

U.S. PATENT DOCUMENTS

| 2013/0101962 A1 | 4/2013 | Howe |
| 2013/0216323 A1 | 8/2013 | Matthias et al. |

(Continued)

FOREIGN PATENT DOCUMENTS

| DE | 102006023673 | 11/2007 |
| EP | 1798459 | 6/2007 |

(Continued)

OTHER PUBLICATIONS

EP Application 18161215—EP Search Report dated Jun. 5, 2018.

(Continued)

*Primary Examiner* — Jeffrey M Wollschlager
*Assistant Examiner* — Xue H Liu
(74) *Attorney, Agent, or Firm* — Derrick Harvey; Harvey Law PC

(57) ABSTRACT

The present invention relates to the field of dentures. More particularly, the present invention relates to manufacturing denture teeth using fixtures to hold the teeth during a scanning, registration and milling sequence. Even more specifically, the present invention relates to using machinable wax to set denture teeth within a fixture, so that the root or crown end of the teeth may be scanned, registered with an ideal tooth model to create a milling strategy, and milled or otherwise have material removed.

20 Claims, 2 Drawing Sheets

(51) Int. Cl.
  *B33Y 80/00* (2015.01)
  *A61C 13/36* (2006.01)
  *A61C 13/225* (2006.01)
  *B29L 31/00* (2006.01)

(56) References Cited

U.S. PATENT DOCUMENTS

2014/0087327 A1* 3/2014 Noack ................ A61C 13/0022
 433/50
2015/0064653 A1 3/2015 Grobbee et al.
2016/0317263 A9 11/2016 Morales et al.
2019/0053881 A1 2/2019 Grobbee et al.

FOREIGN PATENT DOCUMENTS

| EP | 2403427 | 1/2012 |
| EP | 3216420 | 9/2017 |
| EP | 3284438 | 2/2018 |
| WO | WO2010094922 | 8/2010 |

OTHER PUBLICATIONS

EP Application 18189345—EP Search Report dated Jan. 16, 2019.
EP Application 17192480—EP Search Report dated Apr. 11, 2018.
U.S. Appl. No. 15/711,857; Restriction Requirement dated Nov. 29, 2018.

* cited by examiner

TOOTH FIXTURING USING MACHINABLE MATRICES

RELATED APPLICATION

This application is related to and claims priority from U.S. Provisional Application No. 62/426,572 entitled "Tooth Fixturing using Machinable Wax" filed 27 Nov. 2016, the entire contents of which are hereby fully incorporated herein by reference for all purposes.

FIELD OF INVENTION

The present invention relates to the field of dentures. Particularly, the present invention relates to manufacturing denture teeth using fixtures to hold the teeth during a scanning, registration and milling sequence. More particularly, the invention relates to providing a sticking surface within a fixture to help position a tooth for registration. Even more specifically, the present invention relates to using machinable wax to set denture teeth within a fixture, so that the root or crown end of the teeth may be scanned, registered with an ideal tooth model to create a milling strategy, and milled.

BACKGROUND OF THE INVENTION

Dentures have been manufactured for centuries to replace all or part of an individual's teeth with functional dentition. Historically, dentures were made by molding the denture from casts of the patient's edentulous or partially edentulous ridges. The manufacturing process may begin with a preliminary impression of the patient's mouth, which is usually done in silicone or alginate. This impression may be used to prepare a diagnostic cast. While making the impression, the dentist applies pressure to the soft tissues to simulate biting force and extends the borders of the mold to adjacent toothless areas to allow the dentures to better adapt to the gums. A final cast may then be formed from gypsum based on the diagnostic cast. The final cast may be filled or "waxed up" to form the denture. The denture teeth will be set in the wax. The cast with the waxed denture will be placed in a mold and injected or packed with acrylic. Once the resin has cured, the cast may be broken apart and the denture may be removed.

As it has been the practice with Applicant and subsequently many others in the industry, the denture base can be milled from a puck or manufactured by additive printing to accept artificial teeth. Pockets for the teeth may be designed so that they do not penetrate the intaglio surface of the prosthesis. Those reduced pockets necessitate the need for custom root manufactured of an artificial tooth or teeth, as such artificial tooth or teeth must fit the design of the pocket(s) in the prosthesis.

Other recent solutions such as that seen in US 2014/0087326 by Noack, methods for creating artificial teeth are disclosed by utilizing a registered fixture in a milling machine in the following manner: On every tooth are tooth supports that represent the negative of the crown of the tooth, the tooth supports are registered to the fixture, placing the crown of the tooth/teeth in a tooth support using glue, then flipping the fixture and filling the negatives with fixturing wax/matrix. The technician then removes tooth supports and may optionally fill the remainder with wax before placing the fixture in a mill to mill away the crown portion of the tooth/teeth.

However, such processes involving tooth supports or tooth templates are frequently time intensive, and the multiple necessary steps introduce cost, delay, and expense. Requiring the use of physical tooth supports for every tooth in a library of digital teeth is expensive and repetitive for labor purposes. For those maintaining tooth libraries, quality control, accuracy and tracking is overly laborious and rife for error than can set back the entire fabrication process back to the beginning. Thus, there is a need for a denture that may be fixtured using a more universal, efficient set-up. Furthermore, there is a need to be able to expand a tooth library for manufacturers of teeth that builds upon past known geometry, so that the inventory is created as a product of past successful casework. There is a further need for a tooth manufacturing solution for fixturing teeth that aligns digital tooth creation solutions with digital work flow. These needs and other were met with the present solution and invention.

SUMMARY OF THE INVENTION

In accordance with various aspects of the present invention, a tooth fixturing system and process is disclosed. In a first embodiment, a method for removing portions of a root end of an artificial tooth, the method comprising placing a crown end of an artificial tooth on a first side of a mold fixture having at least one supporting element and a base element, the first side having a sticky surface to hold the crown end of the tooth; positioning the mold fixture so that the sticky surface is oriented at a superior level over the base element; adding a machinable matrix to the mold fixture at the second side of the mold fixture to a level that leaves at least a portion of the crown end of the tooth exposed; scanning the crown end into a digital medium; digitally registering the digital medium to a tooth model having desired root end shape to the digital medium; Optionally adding fixturing matrix to the mold fixture; and removing tooth material from the root end of the artificial tooth in the fixturing matrix to achieve the desired root or crown shape according to the tooth model, the method for removing portions of a root end of an artificial tooth, the sticky surface comprising a tape that spans between two points of the supporting element, the first end of the mold fixture being at least partially open, the first end having a sticky surface affixed to a removable face at the first end, the fixturing matrix comprising a machinable wax, whereby the step of removing portions of the root end of an artificial tooth may prevent the root end from protruding through the intaglio surface of a denture, whereby the step of removing portions of the root end of an artificial tooth may prevent the root end from obstructing bar supports, prosthetic attachments, or implant caps, the step of removing tooth material from the root end of the artificial tooth in the fixturing matrix to achieve the desired root shape according to the tooth model being accomplishing through a milling system, the artificial tooth being part of a full or partial denture.

In a second embodiment of the invention, a method for removing portions of a crown end of an artificial tooth is disclosed, the method comprising placing a root end of an artificial tooth on a first side of a mold fixture having at least one supporting element and a base element, the first side having a sticky surface to hold the root end of the tooth; positioning the mold fixture so that the sticky surface is oriented at a superior level over the base element; adding a machinable matrix to the mold fixture at the second side of the mold fixture to a level that leaves at least a portion of the root end of the tooth exposed; scanning the root end into a digital medium; digitally registering the digital medium to a tooth model having desired crown end shape to the digital medium; optionally adding fixturing matrix to the mold fixture; and removing tooth material from the crown end of the artificial tooth in the fixturing matrix to achieve the desired crown shape according to the tooth model, the step of removing portions of the crown end of an artificial tooth comprising modifying the crown end of the artificial tooth to create occlusion with a natural tooth or to an opposing artificial tooth, the sticky surface comprising a tape that spans between two points of the supporting element, the first end having a sticky surface affixed to a removable face at the first end, the first end of the mold fixture being at least partially open, the fixturing matrix comprising a machinable wax, the step of removing tooth material from the crown end of the artificial tooth in the fixturing matrix to achieve the desired root shape according to the tooth model being accomplishing through a milling system, the artificial tooth being a single tooth replacement, or part of a full denture, a partial denture, or a crown and bridge unit.

In another embodiment of the invention, after completing the steps of the method described in the first embodiment, the crown end or root end that did not have material removed may then be scanned, and registered to the tooth model, optionally have the fixture matrix added, and then removing portions of the crown end or root end that did not initially have material removed. The invention may further comprise a method for removing portions of a root end of an artificial tooth as described in previous claims, whereby when the portions of the other of the crown end are removed, the following steps optionally may be omitted; placing a root end of an artificial tooth on a first side of a mold fixture having at least one supporting element and a base element, the first side having a sticky surface to hold the root end of the tooth; adding a machinable matrix to the mold fixture at the second side of the mold fixture to a level that leaves at least a portion of the root end of the tooth exposed, whereby after completion of the step of removing tooth material from the crown end of the artificial tooth in the fixturing matrix to achieve the desired crown shape according to the tooth model, then portions of the root end may then be removed according one or more of the steps in the previous claims.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

This invention achieves the objective of eliminating expensive tooth supports in fixtures used by others in the arts of milling teeth. By eliminating a necessary library of tooth supports, the present invention enables the expansion of a tooth library at a fraction of the cost. The present invention includes in its scope any tooth to be milled for which a prior, virtual geometry is known. The present invention achieves an objective of further digitalization, creating more precise milled products and easier, global storage of workflow data.

A fabricator of dentures or other dental prosthesis may utilize the wax shown in FIGS. 1-4 to accomplish root end milling 60 of such denture teeth, or may use another form of matrix, preferably a product that is machinable and/or will hold form in typical lab conditions. Denture teeth are largely available commercially, and in different numbers and configurations depending upon variables in the patient profile and prosthetic objective. Other dental prosthesis, such as partial dentures, crown and bridge solutions, and single tooth replacement are further within the scope of the present invention. In an embodiment of the invention, the root end of a tooth 10 or teeth may be reduced by milling 60 or other reductive means in an embodiment of the invention to avoid protruding through or avoiding the intaglio surface of the prosthetic. In another embodiment of the invention, root end milling is accomplished to avoid a bar support, clips, prosthetic attachments, implant caps, and the like that may be embedded within a dental prosthesis such as a denture or partial denture, crown and bridge, utilizing the inventive method and system described herein.

Figure 1:
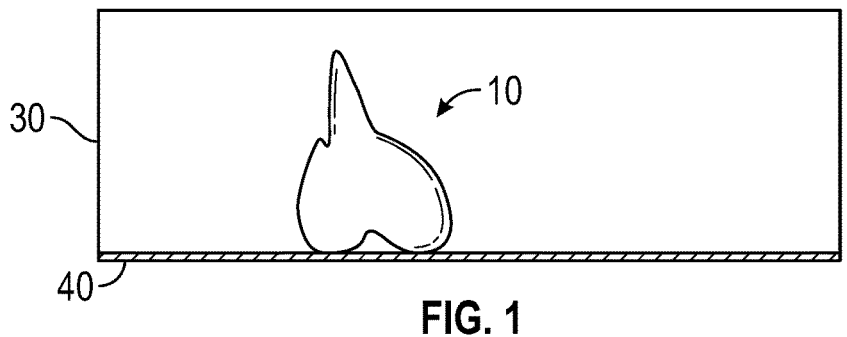
FIG. 1 depicts a side view of the tooth being set at its crown portion onto a sticky surface of a mold fixture.
Figure 2:
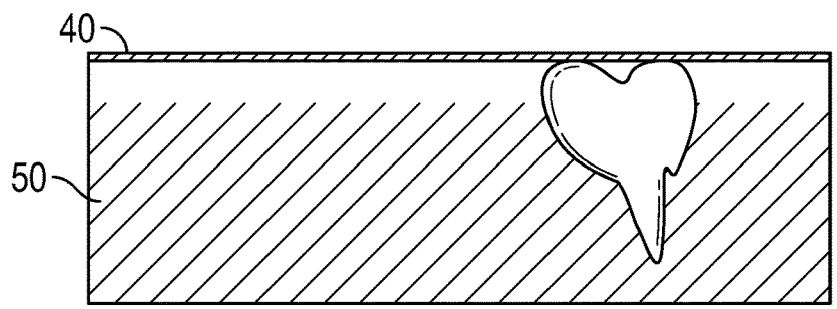
FIG. 2 depicts a side view of the tooth in FIG. 1, having been flipped over so that the fixture is nearly filled with a wax matrix, in accordance with various embodiments.

In FIGS. 1-2, the crown end of the denture teeth may be affixed to a first surface or a temporary surface of a fixture 30 utilized to mount or register a tooth 10. As shown in FIGS. 1-4, fixture 30 is shown as having at least one supportive elements and an enclosing surface. Supporting elements 30 may surround the enclosing surface, as shown, in any number of geometric configurations. For example, fixture 30 may resemble an open ended cylinder, a box, a triangular prism, or any regular or irregular shape, having convex and/or concave surfaces. The first surface may comprise a sticky surface 40 that may temporarily hold the denture teeth, as shown in FIGS. 1-2. Examples of a sticky surface 40 that are illustrative of the invention but not intended to be limiting as to scope may be painter's tape, contact surface, or a sticky surface 40 that may reliably hold a tooth 10 yet is removable from the substrate to which it is applied. The first surface may be applied to the mold fixture 30, as illustrated in FIGS. 1-2, where the first surface spans and sticks to the supporting element(s) 30 that may resemble walls. In other embodiments of the invention, the first surface may be affixed to the fixture yet easily removable/lifted from the fixture by any removable connection known in the arts, such as a key/lock, locking slots, hinging mechanism, frictional fit or screw-fit atop the fixture.

The inventive method and system may further utilize a machinable wax or other fixturing matrix products having properties known in the arts for temporarily binding without creating long-term mechanical bonds. The fixture 30 may then be inverted or flipped over so that the first side holding the tooth 10 is on top, allowing the fixture 30 to be filled with machinable wax 50 as depicted in FIG. 2, to a point where the crown of the denture teeth emerges from the wax 50.

Figure 3:
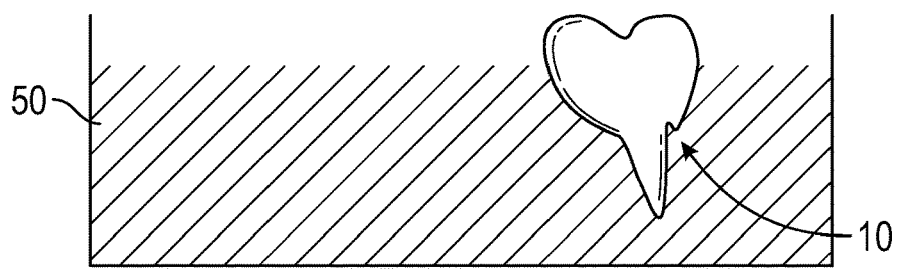
FIG. 3 depicts the side view of FIG. 2, with the tooth prepared for scanning, registration and milling protocols, in accordance with various embodiments.

After adding wax 50 to the fixture 30, the digital milling strategy may be created by scanning the denture teeth fixed in the wax 50, registering the teeth to the patient data, and calculating (or adding variables to the overall calculation) the milling cuts 60 or tooth removal 70 to achieve the digital prosthesis according to the illustration shown in FIG. 3. The resulting scan may result in digital data that is captured in a file, on computer hardware memory, or in other storage means known in the arts and applicable to the preferred imaging and registration solution. After scanning the crown portion, the digital data may be manipulated by software to accomplish the final calculations of the desired tooth profile in line with the overall digital denture or other digital prosthetic design. There are a number of software solutions available to design a final milled tooth and calculate the milling coordinates known in the arts of digital teeth manufacturing.

Figure 4:
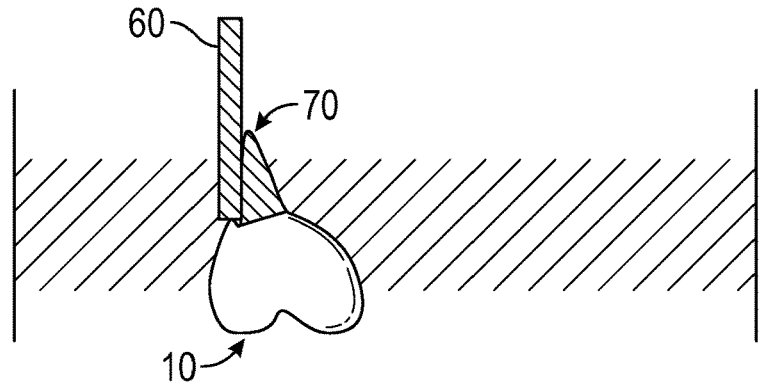
FIG. 4 depicts the side view of FIG. 2, showing the tooth flipped back into the original position from FIG. 1 and being milled, in accordance with milling protocols and various embodiments.
Figure 5:
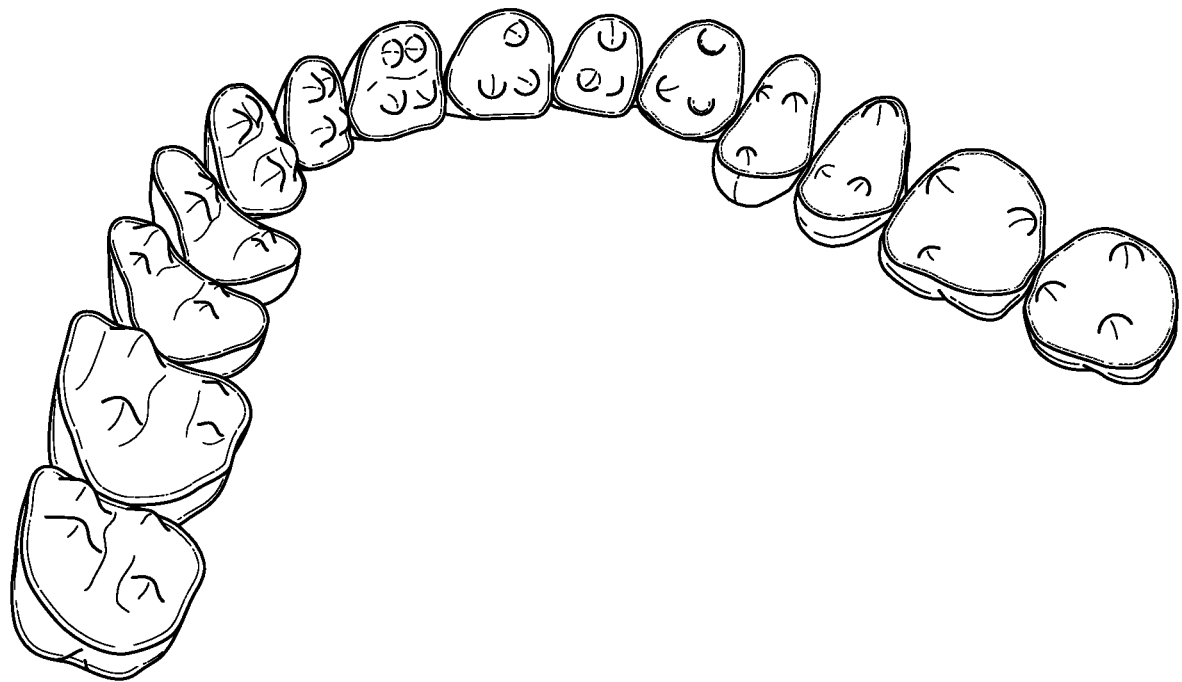
FIG. 5 shows a digital model of an arch on the root side of the teeth, according to an embodiment of the invention.

As shown in FIG. 4, the fixture 30 may then be returned back to its original position, and the root end may be milled 60 according to the milling strategy determined previously, and utilizing patient data to create a final tooth portion (root or crown) that is ideal based upon the patient's physiological intake data and the subsequently-designed digital prosthesis.

Such milling strategies are discussed in greater details in U.S. Prov. Patent Application No. 62/326,772, which is hereby incorporated by reference.

In another embodiment of the invention not illustrated, a method for crown end milling of a denture tooth may comprise a similar manner of steps as with the root end milling. The a root end of a tooth may be placed or temporarily affixed on a first side of a mold fixture, the first side having an adhesive surface to hold the root end of the tooth. The fixture at the second side of the mold fixture may have machinable wax or temporary matrix added to a level that leaves at least a portion of the crown end of the tooth exposed. The fixture may be inverted so that the root end is exposed presented for scanning into a digital medium such as a data file, a program file or other storage media associated with a computing system. The root end may then be digitally registered with a tooth model having desired root shape to the scanned tooth file. This step may be accomplished according to the digital prosthetic software utilized by the user. Optionally, additional fixturing matrix may be added to the fixture so that the tooth is even further stabilized within the matrix. The tooth may then be positioned in a milling system or other ablating system, and have portions removed to match the tooth model having a desired crown shape. The milling system may have the tooth model from the digital prosthetic planning software inputted to remove portions of the crown end of the artificial tooth.

With regards to the embodiment of the crown end of the tooth having portions removed, a further embodiment is disclosed in which the crown end of the tooth is modified to natural occlusion, or in opposition to a natural tooth. In another embodiment, the crown end may be modified to oppose a milled or other artificial tooth.

In another embodiment of the invention, the crown and root ends may be both addressed in the fixture for registration to a designed tooth and subsequent removal of portions of the tooth. In this embodiment, after completing the steps of the method of reducing either the crown end of the tooth or the root end of the tooth, then the opposite end that did not have material removed may then be scanned, and registered to the tooth model, optionally have the fixture matrix added, and then removing portions of the crown end or root end that did not initially have material removed. In other words, the unremoved end of the tooth would be further stabilized if necessary with additional fixture matrix before and/or after scanned for registration to the model tooth, and the unremoved end would have material removed so that, regardless of order of operations, both the crown end and the root end would be customized to the model tooth by way of the inventive method disclosed herein.

The artificial tooth or teeth may be fully formed and finalized as described in the above embodiments of the invention, and affixed to a full or partial denture base as applicable and according to known techniques in the state of the art.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "proximate," "proximately," or any other variation thereof, are intended to cover a physical connection, an electrical connection, a magnetic connection, an optical connection, a communicative connection, a functional connection, and/or any other connection. When language similar to "at least one of A, B, or C" is used, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A method for removing portions of a root end of an artificial tooth, the method sequentially comprising:

Placing a crown end of an artificial tooth on a first side of a mold fixture having at least one supporting element and a base element, the first side having a sticky surface to hold the crown end of the tooth;

Positioning the mold fixture so that the sticky surface is oriented at a superior level over the base element;

Adding a machinable matrix to the mold fixture at a second side of the mold fixture to a level that leaves at least a portion of the crown end of the tooth exposed;

Scanning the crown end into a digital medium;
Digitally registering the digital medium to a tooth model having desired root end shape to the digital medium;
Removing tooth material from the root end of the artificial tooth to achieve the desired tooth shape according to the tooth model.

2. The method for removing portions of a root end of an artificial tooth in claim 1, the sticky surface comprising a tape that spans between two points of the supporting element.

3. The method for removing portions of a root end of an artificial tooth in claim 2, the first end of the mold fixture being at least partially open.

4. The method for removing portions of a root end of an artificial tooth in claim 1, the first end having a sticky surface affixed to a removable face at the first end.

5. The method for removing portions of a root end of an artificial tooth in claim 1, the method further comprising the step of:
Adding fixturing matrix to the mold fixture.

6. The method for removing portions of a root end of an artificial tooth in claim 1, whereby the step of removing portions of the root end of an artificial tooth prevents the root end from protruding through a intaglio surface of a denture.

7. The method for removing portions of a root end of an artificial tooth in claim 1, whereby the step of removing portions of the root end of an artificial tooth prevents the root end from obstructing bar supports, prosthetic attachments, or implant caps.

8. The method for removing portions of a root end of an artificial tooth in claim 1, the step of removing tooth material from the root end of the artificial tooth in the fixturing matrix to achieve the desired root shape according to the tooth model being accomplishing through a milling system.

9. The method for removing portions of a root end of an artificial tooth in claim 1, the artificial tooth being part of a full or partial denture.

10. A method for removing portions of a crown end of an artificial tooth, the method comprising:
Placing a root end of an artificial tooth on a first side of a mold fixture having at least one supporting element and a base element, the first side having a sticky surface to hold the root end of the tooth;
Positioning the mold fixture so that the sticky surface is oriented at a superior level over the base element;
Adding a machinable matrix to the mold fixture at a second side of the mold fixture to a level that leaves at least a portion of the root end of the tooth exposed;
Scanning the root end into a digital medium;
Digitally registering the digital medium to a tooth model having desired crown end shape to the digital medium;
Optionally adding fixturing matrix to the mold fixture; and
Removing tooth material from the crown end of the artificial tooth in the fixturing matrix to achieve the desired crown shape according to the tooth model.

11. The method for removing portions of the crown end of an artificial tooth in claim 10, the step of removing portions of the crown end of an artificial tooth comprising modifying the crown end of the artificial tooth to create occlusion with a natural tooth or to an opposing artificial tooth.

12. The method for removing portions of a crown end of an artificial tooth in claim 10, the sticky surface comprising a tape that spans between two points of the supporting element.

13. The method for removing portions of a crown end of an artificial claim 10, the first end having a sticky surface affixed to a removable face at the first end.

14. The method for removing portions of a crown end of an artificial tooth in claim 10, the first end of the mold fixture being at least partially open.

15. The method for removing portions of a root end of an artificial tooth in claim 10, the fixturing matrix comprising a machinable wax.

16. The method for removing portions of a crown end of an artificial tooth in claim 10, the step of removing tooth material from the crown end of the artificial tooth in the fixturing matrix to achieve the desired root shape according to the tooth model being accomplishing through a milling system.

17. The method for removing portions of a crown end of an artificial claim 11, the artificial tooth being a single tooth replacement, or part of a full denture, a partial denture, or a crown and bridge unit.

18. The method for removing portions of a root end of an artificial tooth in claim 1, whereby after completion of the step of removing tooth material from the root end of the artificial tooth in the fixturing matrix to achieve the desired root shape according to the tooth model, then portions of the crown end may then be removed according to the steps in claim 1.

19. The method for removing portions of a root end of an artificial tooth in claim 18, whereby when the portions of the other of the crown end are removed, the following steps optionally may be omitted:
Placing a root end of an artificial tooth on a first side of a mold fixture having at least one supporting element and a base element, the first side having a sticky surface to hold the root end of the tooth;
Adding a machinable matrix to the mold fixture at the second side of the mold fixture to a level that leaves at least a portion of the root end of the tooth exposed.

20. The method for removing portions of a crown end of an artificial claim 10, whereby after completion of the step of removing tooth material from the crown end of the artificial tooth in the fixturing matrix to achieve the desired crown shape according to the tooth model, then portions of the root end may then be removed.

* * * * *